F. C. WEBER & F. M. ALLEN.
MACHINE FOR CUTTING AND EVISCERATING FISH.
APPLICATION FILED DEC. 16, 1915.
1,202,627.
Patented Oct. 24, 1916.
5 SHEETS—SHEET 2.
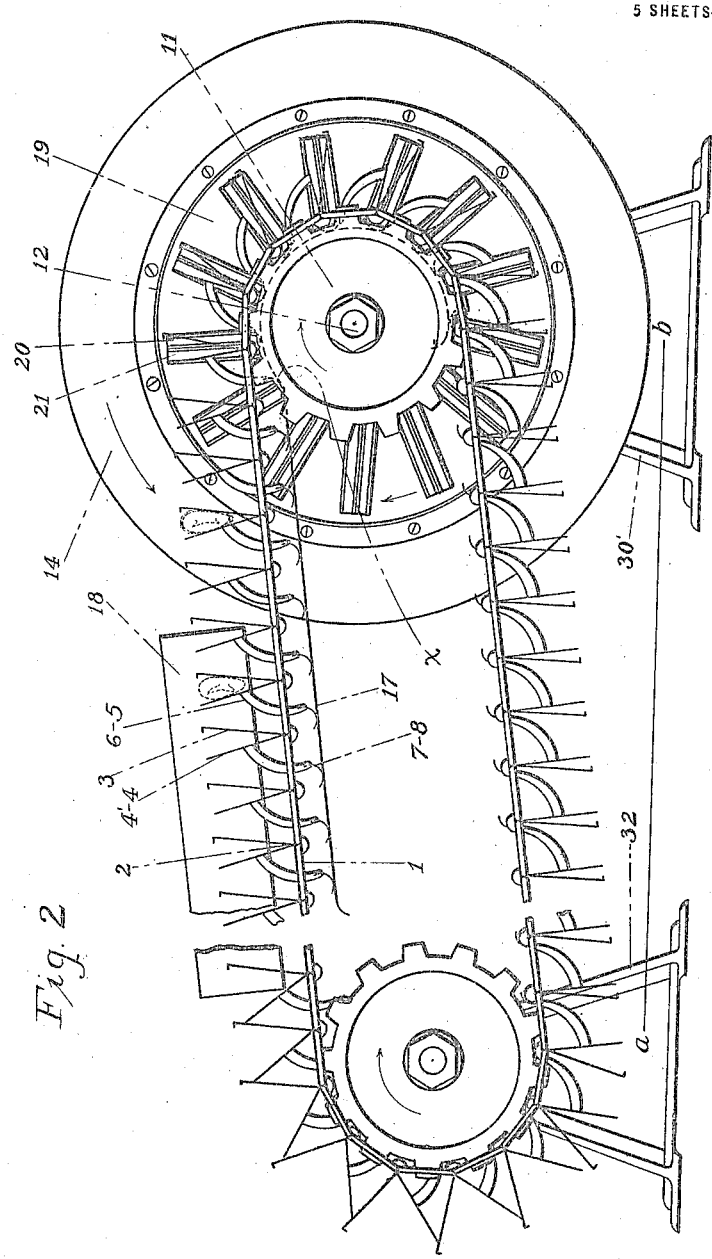

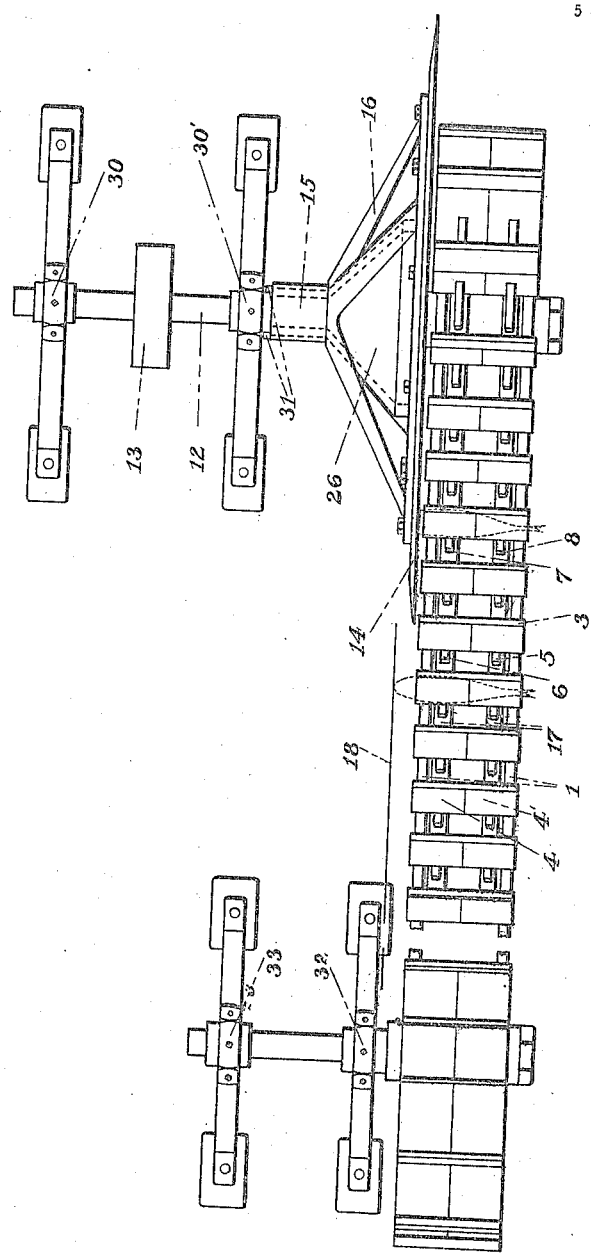

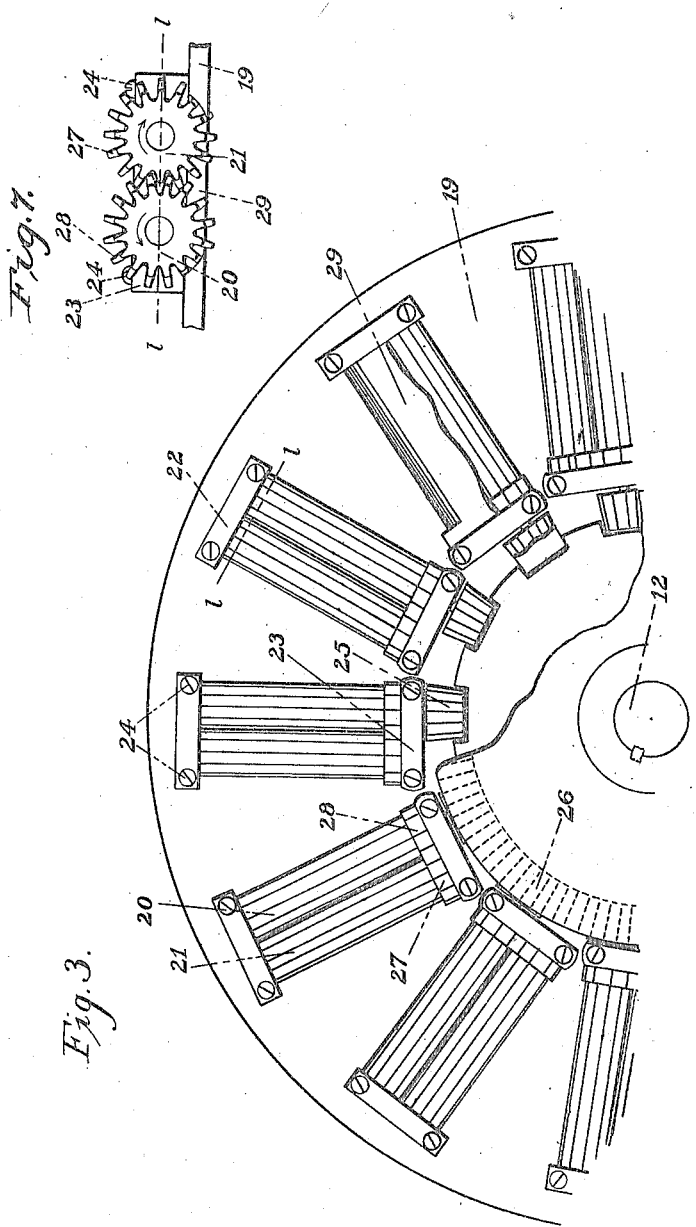

F. C. WEBER & F. M. ALLEN.
MACHINE FOR CUTTING AND EVISCERATING FISH.
APPLICATION FILED DEC. 16, 1915.
1,202,627.
Patented Oct. 24, 1916.
5 SHEETS—SHEET 4.
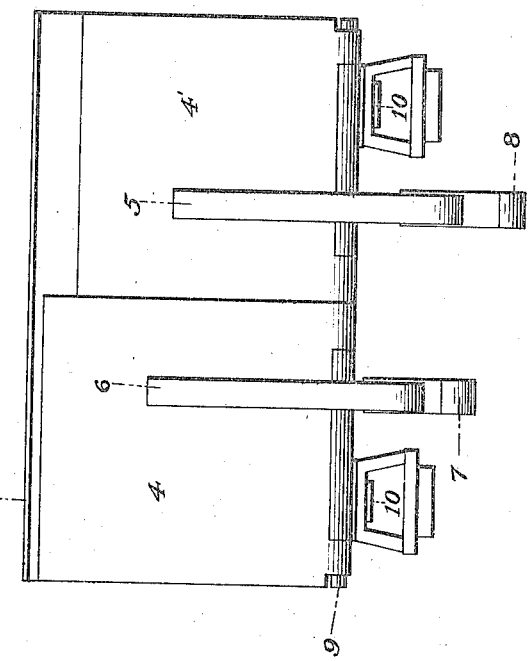
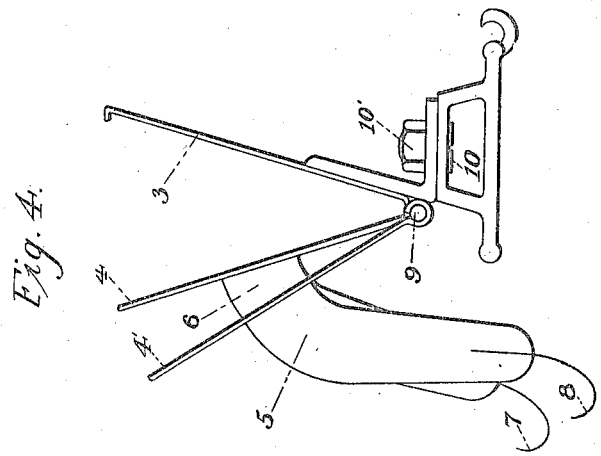

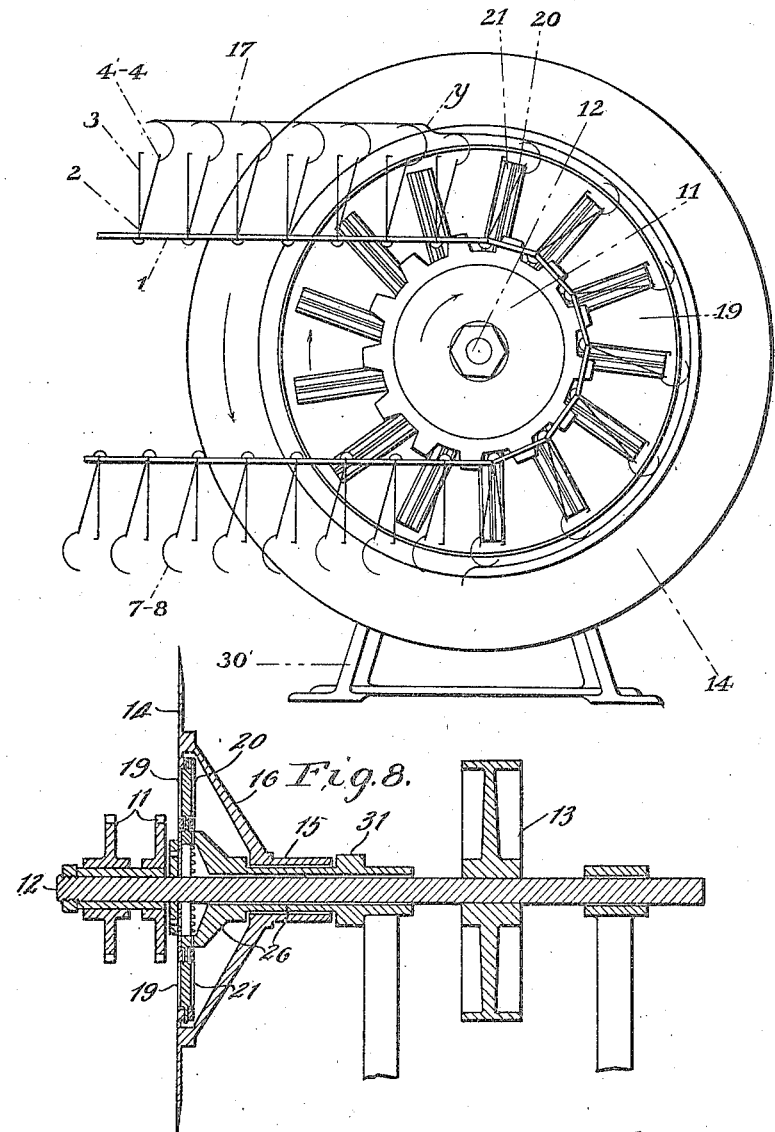

UNITED STATES PATENT OFFICE.

FREDERICK C. WEBER, OF BETHESDA, MARYLAND, AND FRANK M. ALLEN, OF WASHINGTON, DISTRICT OF COLUMBIA.

MACHINE FOR CUTTING AND EVISCERATING FISH.

1,202,627.

Specification of Letters Patent.   Patented Oct. 24, 1916.

Application filed December 16, 1915.   Serial No. 67,216.

(DEDICATED TO THE PUBLIC.)

*To all whom it may concern:*

Be it known that we, FREDERICK C. WEBER and FRANK M. ALLEN, citizens of the United States of America, and employees of the Department of Agriculture of the said United States, said FREDERICK C. WEBER residing in the town of Bethesda, State of Maryland, (whose post-office address is Bethesda, Maryland,) and the said FRANK M. ALLEN residing in the city of Washington, District of Columbia, (whose post-office address is Washington, District of Columbia,) have invented a new and useful Improvement in Machines for Cutting and Eviscerating Fish.

This application is made under the act of March 3, 1883, chapter 143 (22 Stat., 625), and the invention herein described and claimed may be used by the Government of the United States or any of its officers or employees in the prosecution of work for the United States, or by any person in the United States, without the payment of any royalty thereon.

Our invention relates to a machine which may be adapted to any uniform size and kind of fish by varying the proportions of its working parts, but is more particularly adapted for fish to be utilized for canning purposes.

The machine is adapted to cut off the heads of fish and to clean them at the same operation by the removal of the entrails.

The object of our invention is to provide a machine of the character hereinafter described, in which collapsible hoppers, mounted on an endless chain belt, are utilized for grasping and holding the fish, after they are located with their heads against a suitable gage, in position for the heads to be severed, which operation is performed by a cutting disk rotating in opposite direction to the direction of the endless chain belt; said hoppers being further adapted to give sufficient pressure at a proper time to cause the ejection of a portion of the viscera which engages in the eviscerating rolls, arranged, in a disk, concentric with and flush with the surface of the rotating cutting disk, and traveling in the same direction with the endless chain belt.

The invention consists in the combination and arrangement of parts set forth in the following details of the operative procedure and as set forth in the claims.

Referring to the drawings, Figure 1 is a top plan view of our invention; Fig. 2 is a side elevation; Fig. 3 is a side elevation of a portion of the inner rotating disk, rear view, showing the mounting and drive of the eviscerating rolls; Fig. 4 is an end view of the hoppers; Fig. 5 is a rear view of the hoppers; Fig. 6 is a side elevation of a portion of the device showing the compression bar arranged in another position on the machine, and showing the springs attached to the hoppers in another position to suit this different arrangement of the compression bar; Fig. 7 is an end elevation of a pair of eviscerating rolls with their actuating gears; and Fig. 8 is a cross section through the line 1—2 of Fig. 1.

The fish, in proper position or "headed," are led by any suitable pipe or trough to the cutting and eviscerating machine and are directed on to the conveyer belt 1 (Figs. 1 and 2). This belt is constructed as follows: An endless chain conveyer belt 1 of any suitable length is provided, upon which is mounted a continual line of hoppers, 2, constructed as shown by Figs. 4 and 5. The hoppers, as herein described, are in three sections, 3 being a stationary member, 4 being one moving member and 4' being another moving member, and are actuated by arms 5 and 6 and springs 7 and 8. Two or more moving members may be employed. Moving parts, 4, 4', 5, 6, 7 and 8, are pivoted at 9 on link of belt 1. The parts are mounted and secured on to links of belt, 1, by screw, 10, and locknut, 10'. The conveyer belt is moved clockwise as indicated, by means of sprocket wheel, 11, which is secured to shaft 12, driven by pulley, 13, causing conveyer belt, 1, to pass rotating cutting knife, 14. This cutting knife, 14, is revolved in the opposite direction to that of the conveyer belt, 1, by pulley, 15, which is attached to spider, 16, to which is secured revolving knife, 14. As conveyer, 1, with fish is moved toward rotating knife, 14, the movable parts, 4 and 4' (Fig. 4), of hopper, 2 (Fig. 2), are actuated by arms, 5 and 6, and springs, 7 and 8, which come in contact and are raised by compression bar, 17. The hopper, 2, closes upon the fish with sufficient pressure to hold the fish in position during the cutting operation against the gage plate, 18. The gage plate, 18, is adjustable, horizontally, for fish of different sizes. Conveyer belt, 1, with hoppers, 2, passes toward the rotating knife, 14, and over compression bar, 17, and hopper, 2, closes on the fish in hoppers, 2, on conveyer belt 1, passing rotating knife, 14. The portions of the fish which project against the gage plate, 18, and beyond hoppers, 2, will be cut off by rotating cutting knife, 14. As conveyer 1 continues to pass this knife, 14, the viscera of the fish is, by a continual pressure of springs, 7 and 8, acting on arms, 5 and 6, actuating the movable parts, 4 and 4', of hoppers, 2, forced against the face of rotating knife, 14, and is passed on and against revolving disk, 19, carrying eviscerating rollers, 20 and 21.

The position of hoppers, 2, with relation to eviscerating rolls in rotating disk, 19, is such that the openings in hoppers, 2, are immediately in front of and in line with the meshing pitch line of eviscerating rolls, 20 and 21. These rollers are corrugated axially and are revolved toward each other and from hoppers, 2. They are actuated as follows: Rollers 20 and 21 upon disk 19 are mounted radially or at any other angle desired, as shown in Fig. 3, in pairs and intermeshing. They are attached on the opposite side of disk 19 to that which is toward hoppers, the addendum circle coming flush with face of disk 19 toward hoppers, through openings 29 in said disk, and shown in cross section through 1—1. They are held in place by bearings 22 and 23, which bearings are secured to disk 19, by screws, 24. Eviscerating roller 20 is actuated by bevel gear 25, which in turn is actuated by being in mesh with large stationary bevel gear, 26. As disk 19, carrying eviscerating rollers 20 and 21 revolves with bevel gear 25, intermeshed with stationary bevel gear, 26, this causes gear 25 and roller 20 to revolve around the general axis 12, at the same time revolving upon its own bearings 22 and 23. Roller 21, actuated by spur gear 27, meshing into the spur gear 28, on roll 20, which is actuated by bevel gear 25, which receives its action from stationary bevel gear 26, causes roller 21 to revolve in the opposite direction to the rotative action of roller 20 and both rollers away from hoppers 2. As hoppers 2, containing fish, the heads of which have been severed as above described, come directly opposite the meshing point of the eviscerating rollers 20 and 21, the operating springs 7 and 8 are caused by a cam, $x$, that is properly positioned relative to the rotating action of disk 19, upon the compression bar, 17, to exert additional pressure upon movable sections 4 and 4' of hoppers 2, causing the viscera to be suddenly projected into the eviscerating rollers 20 and 21.

The continued revolving of disk 19 carrying the rollers 20 and 21 revolving upon their own bearings 22 and 23 and around the main axis, 12, through approximately 180°, causes the viscera to be drawn from the body of the fish, and entirely removed. The fish may be delivered at any point desired in the length of the lower portion of the endless belt, 1, between $a$ and $b$, Fig. 2. The number of hoppers used may be made to suit conditions as they appear in pract We do not confine ourselves to placing the compression bar 17 in the position as shown in Fig. 2 nor as to the manner of attaching the actuating springs of the movable parts of the hoppers. This may be more fully understood by referring to Fig. 6 of the drawings. Hoppers 2 are attached to the endless conveyer belt 1 in the same manner as already described, but are mounted in the reverse position, as shown in Fig. 6. Attached to the movable parts 4 and 4' of hoppers 2 are the springs 7 and 8, which come in contact with the compression bar 17 (Fig. 6), placed as shown, and causes the movable parts 4 and 4' of hoppers 2 to operate and close on the fish, thus holding them firmly against the stationary member 3 of hoppers 2. As hoppers 2, containing fish, the heads of which have been severed as above described, come directly opposite the meshing point of the eviscerating rollers 20 and 21, the operating springs 7 and 8 are caused by a cam, $y$, that is properly positioned relative to the rotating action of disk 19, on the compression bar 17, to exert additional pressure upon movable sections 4 and 4' of hoppers 2, causing the viscera to be suddenly projected into the eviscerating rollers 20 and 21. The compression bar continues, as shown in Fig. 6, in a semicircular position and is so adjusted as to cause sufficient pressure on springs 7 and 8 operating movable parts 4 and 4' against stationary member 3 of hoppers 2, to hold the fish in apposition to eviscerating rollers 20 and 21, through approximately 180°.

The drive to power shaft is as follows: Shaft 12 is mounted in suitable bearings 30 and 30'. Upon this shaft is drive pulley 13 for revolving eviscerating disk 19 and eviscerating rollers 20 and 21. This pulley 13 should be of suitable size for speed desired and securely fastened upon shaft 12. On this shaft beyond bearing 30' is mounted stationary bevel gear 26 and holder 31 for stationary bevel gear 26. Upon an extension of bevel gear 26 is mounted spider 16 and pulley 15 for driving cutting knife 14. The conveyer belt 1 is held in an operative position by suitable bearings 32 and 33 placed as desired and may be mounted upon a frame or set on the floor. These moving parts may be driven by two or more belts or be directly connected.

Having thus described our invention, we claim:

1. The combination with conveying means comprising a movable hopper including means to clamp a fish in said hopper, of means to decapitate and means to eviscerate a fish, said fish clamping means being constructed to subject a fish to further pressure to partially eject the viscera after decapitation to enable the eviscerating means to operate.

2. An apparatus for the described purpose, comprising a conveyer, a drive shaft suitably mounted and passing through a stationary bevel gear having an extension bearing carrying a spider, said conveyer carrying a series of collapsible hoppers, each provided with two or more clamps for clasping and holding the fish in position for cutting and eviscerating, said drive shaft carrying a sprocket wheel over which said conveyer travels and a rotating annulus carrying eviscerating rolls, said spider carrying a cutting implement adapted to rotate in an opposite direction to the said annulus, which said cutting implement and eviscerating rolls are arranged in operative position with respect to said conveyer.

3. An apparatus for the purpose described, comprising a conveyer, a drive shaft suitably mounted and passing through a stationary bevel gear having an extension bearing carrying a spider, said conveyer carrying a series of hoppers each provided with two or more clamps for clasping and holding the fish in position for cutting and eviscerating, said drive shaft carrying a sprocket wheel over which said conveyer travels and having secured thereto a rotating annulus carrying movable eviscerating rolls suitably adjusted, said spider carrying a revolving cutting implement rotating around said annulus, said eviscerating rolls adapted to revolve in an opposite direction to each other, and said conveyer and cutting implement adapted to rotate in an opposite direction to each other.

4. An apparatus for the described purpose, comprising a conveyer, a drive shaft suitably mounted and passing through a stationary bevel gear having an extension bearing carrying a spider and a compression bar, said conveyer carrying a series of hoppers each provided with two or more clamps, said drive shaft carrying a sprocket wheel over which said conveyer travels and having secured thereto a rotating annulus carrying movable eviscerating rolls, said spider carrying a revolving cutting implement rotating around said annulus, said clamps provided with spring attachment engaging and traveling on said compression bar which is adjusted to give sufficient pressure for firmly holding the fish in position for decapitation by the cutting means and immediately thereafter increasing the pressure by proper means for partially ejecting viscera, preliminary to complete withdrawal by the eviscerating rolls.

5. An apparatus for the described purpose, the combination with a rotary cutting annulus, an inner rotating disk carrying a multiple of eviscerating rolls traveling in an opposite direction thereto, a conveyer for carrying the fish within the sphere of the cutting disk and the eviscerating rolls for cutting and eviscerating the fish.

6. An apparatus for the described purpose, comprising a conveyer for carrying the fish to the cutting and eviscerating means, a cutting disk rotating in the opposite direction to said conveyer, a rotating disk concentric to and flush with the face of a rotating, cutting disk and provided with a multiple of corrugated rolls, mounted in pairs, each revolving in the opposite direction to the other roll of the pair, said rolls so arranged on the rotating disk as to engage the ejected viscera in apposition to said rolls.

In testimony whereof, we affix our signatures in the presence of two subscribing witnesses.

FREDERICK C. WEBER.
FRANK M. ALLEN.

Witnesses:
HARRISON E. PATTEN,
W. T. CARRIGAN, Jr.